US012679949B2

(12) United States Patent
Aloui Dalibey

(10) Patent No.: US 12,679,949 B2
(45) Date of Patent: Jul. 14, 2026

(54) PROCESS FOR DEGRADING PLASTIC PRODUCTS

(71) Applicant: CARBIOS, Clermont-Ferrand (FR)

(72) Inventor: Madiha Aloui Dalibey, Clermont-Ferrand (FR)

(73) Assignee: CARBIOS, Clermont-Ferrand (FR)

( * ) Notice: Subject to any disclaimer, the term of this patent is extended or adjusted under 35 U.S.C. 154(b) by 916 days.

(21) Appl. No.: 17/786,580

(22) PCT Filed: Dec. 18, 2020

(86) PCT No.: PCT/EP2020/087213
§ 371 (c)(1),
(2) Date: Jun. 17, 2022

(87) PCT Pub. No.: WO2021/123301
PCT Pub. Date: Jun. 24, 2021

(65) Prior Publication Data
US 2023/0049607 A1     Feb. 16, 2023

(30) Foreign Application Priority Data
Dec. 19, 2019     (EP) ..................................... 19218111

(51) Int. Cl.
*C08J 11/10*     (2006.01)
*B29C 48/05*     (2019.01)
*D01D 5/08*     (2006.01)

(52) U.S. Cl.
CPC .............. *C08J 11/105* (2013.01); *B29C 48/05* (2019.02); *D01D 5/08* (2013.01); *B29C 2948/92209* (2019.02); *C08J 2367/02* (2013.01)

(58) Field of Classification Search
CPC ........................... C08J 11/105; D01D 5/08–10
See application file for complete search history.

(56) References Cited

U.S. PATENT DOCUMENTS

| | | |
|---|---|---|
| 10,124,512 B2 | 11/2018 | Boisart et al. |
| 10,287,561 B2 | 5/2019 | Alvarez et al. |
| 10,385,183 B2 | 8/2019 | Maille |
| 10,508,269 B2 | 12/2019 | Li et al. |
| 10,584,320 B2 | 3/2020 | Topham et al. |
| 10,590,401 B2 | 3/2020 | Tournier et al. |
| 10,626,242 B2 | 4/2020 | Ferreira et al. |
| 10,717,996 B2 | 7/2020 | Dusseaux et al. |
| 10,723,848 B2 | 7/2020 | Chateau et al. |
| 10,767,026 B2 | 9/2020 | Desrousseaux et al. |
| 10,829,598 B2 | 11/2020 | Ferreira et al. |
| 10,829,754 B2 | 11/2020 | Marty et al. |
| 11,072,784 B2 | 7/2021 | Tournier et al. |
| 11,198,767 B2 | 12/2021 | Guemard et al. |
| 11,345,906 B2 | 5/2022 | Marty et al. |
| 2015/0290840 A1* | 10/2015 | Boisart ................... B29B 17/00 |
| | | 435/142 |

| | | |
|---|---|---|
| 2020/0190279 A1 | 6/2020 | Guemard et al. |
| 2020/0339766 A1 | 10/2020 | Chateau et al. |
| 2020/0385698 A1 | 12/2020 | Marty et al. |
| 2020/0392303 A1 | 12/2020 | Desrousseaux et al. |
| 2021/0009765 A1 | 1/2021 | Ferreira et al. |
| 2021/0163906 A1 | 6/2021 | David et al. |
| 2021/0171921 A1 | 6/2021 | Andre et al. |
| 2021/0180037 A1 | 6/2021 | Duquesne et al. |
| 2021/0261931 A9 | 8/2021 | Topham et al. |
| 2021/0291421 A1* | 9/2021 | Nattrass .............. B29C 48/0011 |
| 2022/0002516 A1 | 1/2022 | Chateau |
| 2022/0177697 A1 | 6/2022 | Guillamot et al. |
| 2023/0034354 A1 | 2/2023 | Chateau |
| 2023/0048275 A1 | 2/2023 | Marty et al. |
| 2023/0135014 A1 | 5/2023 | Topham et al. |

FOREIGN PATENT DOCUMENTS

| | | | |
|---|---|---|---|
| CN | 101812742 | 8/2010 | |
| CN | 109423699 A * | 3/2019 | .............. C08J 11/24 |
| CN | 110229378 A * | 9/2019 | ............. B29B 17/00 |
| JP | 2000-344933 | 12/2000 | |
| WO | WO 2020/094646 | 5/2020 | |
| WO | WO 2020/193781 | 10/2020 | |
| WO | WO 2021/005198 | 1/2021 | |
| WO | WO 2021/005199 | 1/2021 | |
| WO | WO 2021/099337 | 5/2021 | |
| WO | WO 2021/123299 | 6/2021 | |
| WO | WO 2021/123328 | 6/2021 | |

OTHER PUBLICATIONS

Han, D. et al. Stimuli-Responsive Self-Immolative Polymer Nanofiber Membranes Formed by Coaxial Electrospinning. ACS Appl. Mater. Interfaces 2017, 9, 11858-11865 (Year: 2017).*
Translation of CN 110229378 by Shi et al. (Year: 2019).*
Translation of CN109423699A by Ni. (Year: 2019).*
Machine translation of CN 104928930 by Guo et al. (Year: 2015).*
Database WPI, Accession No. 2007-519843, Jun. 7, 2007, pp. 1-2, XP-002798598.
Database WPI, Accession No. 2001-268520, Feb. 13, 2001, p. 1, XP-002798599.
Written Opinion in International Application No. PCT/EP2020/087213, Apr. 23, 2021, pp. 1-8.
Claims as filed in U.S. Appl. No. 17/706,644, filed Mar. 29, 2022, pp. 1-5.
Claims as filed in U.S. Appl. No. 17/291,291, corresponding to WO 2020/094646, May 5, 2021, pp. 1-3.

(Continued)

*Primary Examiner* — Christina H. W. Rosebach

(74) *Attorney, Agent, or Firm* — SALIWANCHIK, LLOYD & EISENSCHENK

(57) ABSTRACT

The present invention relates to a process for degrading a plastic product comprising at least one polymer, the process comprising submitting the plastic product to a spinning step to obtain fibers of said plastic product; and depolymerizing at least one polymer of said fibers.

17 Claims, No Drawings

Specification includes a Sequence Listing.

(56)  References Cited

OTHER PUBLICATIONS

Claims as filed in U.S. Appl. No. 17/625,782, corresponding to WO 2021/005199, Jan. 10, 2022, pp. 1-4.
Claims as filed in U.S. Appl. No. 17/625,783, corresponding to WO 2021/005198, Jan. 10, 2022, pp. 1-3.
Claims as filed in U.S. Appl. No. 17/744,773, corresponding to WO 2021/099337, May 16, 2022, pp. 1-4.

\* cited by examiner

PROCESS FOR DEGRADING PLASTIC PRODUCTS

CROSS-REFERENCE TO RELATED APPLICATION

This application is the U.S. national stage application of International Patent Application No. PCT/EP2020/087213, filed Dec. 18, 2020.

REFERENCE TO SEQUENCE LISTING

The Sequence Listing for this application is labeled "Seq-List.txt" which was created on May 23, 2022 and is 3 KB. The entire content of the sequence listing is incorporated herein by reference in its entirety.

The present invention relates to a process for degrading plastic products. The process of the invention particularly comprises a step of spinning a plastic product prior depolymerizing at least one polymer of said spun plastic product. The process of the invention is particularly useful for degrading a plastic product comprising polyester and/or polyamide, preferably polyethylene terephthalate and/or polylactic acid. The invention also relates to a process for producing monomers and/or oligomers from a spun plastic product.

BACKGROUND

Plastics are inexpensive and durable materials, which can be used to manufacture a variety of products that find uses in a wide range of applications (food packaging, textiles, etc.). As a consequence, the production of plastics has increased dramatically over the last decades. Moreover, most of them are used for single-use disposable applications, such as packaging, agricultural films, disposable consumer items or for short-lived products that are discarded within a year of manufacture. Because of the durability of the polymers involved, substantial quantities of plastics are piling up in landfill sites and in natural habitats worldwide, generating increasing environmental problems. For instance, in recent years, polyethylene terephthalate (PET), an aromatic polyester produced from terephthalic acid and ethylene glycol, has been widely used in the manufacture of several products for human consumption, such as food and beverage packaging (e.g.: bottles, convenience-sized soft drinks, pouches for alimentary items) or textiles, fabrics, rugs, carpets, etc.

Different solutions, from plastic degradation to plastic recycling, have been studied to reduce environmental and economic impacts correlated to the accumulation of plastic waste, including recycling technologies and energy production from such plastics. Mechanical recycling technology remains the most-used technology, but it faces several drawbacks. Indeed, it requires an extensive and costly sorting and it leads to downgrading applications, due to loss of molecular mass during the process and uncontrolled presence of additives in the recycled products. The actual recycling technologies are also expensive, so that the recycled plastic products are generally non-competitive compared to virgin plastic.

Recently, innovative processes of enzymatic recycling of plastic products have been developed and described (e.g. WO 2014/079844, WO 2015/097104, WO 2015/173265 et WO 2017/198786). Contrary to traditional recycling technologies, such enzymatic depolymerization processes allow to recover the chemical constituents of the polymer (i.e. monomers and/or oligomers). The resulting monomers/oligomers may be recovered and used to re-manufacture plastic items, so that such processes lead to an infinite recycling of plastics. These processes are particularly useful for recovering terephthalic acid and ethylene glycol from plastic products comprising PET.

However, there is always a need for processes with improved rate of degradation.

SUMMARY OF THE INVENTION

By working on improvements of processes for degrading plastic products, the inventors have shown that the degrading step can be improved by increasing the contact area between the plastic product and the degrading agent. The inventors have thus developed a process wherein the surface area of the plastic is increased by transforming the plastic product into fibers before submitting said fibers to the degrading step. More particularly, the inventors propose to spin the plastic product before to submit said spun plastic product (i.e. fibers) to depolymerization. The methods of the invention are particularly useful for degrading plastic products comprising polyethylene terephthalate.

In this regard, it is an object of the invention to provide a process for degrading a plastic product comprising at least one polymer, the process comprising the steps of submitting the plastic product to a spinning step to obtain fibers of said plastic product; and depolymerizing at least one polymer of said fibers. Preferably, the step of spinning is a melt-spinning step implemented with a plastic product in a partially or totally molten state, performed at a temperature above the crystallization temperature (Tc) of at least one polymer of the plastic product, preferably at or above the melting temperature (Tm) of said polymer.

Advantageously, the cooling of the resulting fibers is performed at a temperature below the crystallization temperature (Tc) of at least one target polymer of the plastic product, preferably below the glass transition temperature (Tg) of said polymer.

In an embodiment, the process is implemented on rigid or flexible plastic wastes, including plastic bottles, plastic trays, plastic bags and plastic packaging, soft and/or hard plastics, and/or from crystalline plastic fibers, particularly from plastic fibers comprising thermoplastic polymers.

It is also an object of the invention to provide a process for degrading a plastic product comprising PET, comprising the steps of a. Submitting said plastic product to melt-spinning at a temperature above 170° C., preferably at or above 230° C. to obtain fibers from said plastic product, wherein the cooling of the resulting fibers is performed at a temperature below 100° C., preferably below 90° C.;

b. Depolymerizing PET in said fibers, preferably by contacting said fibers to a depolymerase, such as a cutinase; and optionally c. Recovering and optionally purifying oligomers and/or monomers resulting from depolymerization of said PET.

It is also an object of the invention, to provide a method of producing monomers and/or oligomers and/or degradation products from a plastic product comprising at least one polymer, preferably PET, comprising submitting successively the plastic product to a spinning step, and to a depolymerizing step, preferably comprising exposing the plastic product to a depolymerase, preferably a cutinase.

DETAILED DESCRIPTION OF THE INVENTION

Definitions

The present disclosure will be best understood by reference to the following definitions.

Within the context of the invention, the terms "plastic article" or "plastic product" are used interchangeably and refer to any item or product comprising at least one polymer, such as plastic sheet, tray, tube, rod, profile, shape, massive block, fiber, etc. Preferably, the plastic article is a manufactured product, such as rigid or flexible packaging (bottle, trays, cups, etc.), agricultural films, bags and sacks, disposable items or the like, carpet scrap, fabrics, textiles, etc. More preferably, plastic article refers to plastic or textile waste. Preferably, a plastic article comprises a mix of semi-crystalline and/or amorphous polymers. The plastic article may further contain additional substances or additives, such as plasticizers, minerals, organic fillers, dyes etc.

A "polymer" refers to a chemical compound or mixture of compounds whose structure is constituted of multiple repeating units (i.e. "monomers") linked by covalent chemical bonds. Within the context of the invention, the term "polymer" refers to such chemical compound used in the composition of a plastic product. As an example, synthetic polymers include polymers derived from petroleum oil, such as polyolefins, aliphatic or aromatic polyesters, polyamides, polyurethanes and polyvinyl chloride. In the context of the invention, polymer refers to thermoplastic polymer, i.e. a polymer that becomes moldable above a specific temperature and solidifies upon cooling.

The term "depolymerization", in relation to a polymer or plastic article containing a polymer, refers to a process by which a polymer or at least one polymer of said plastic article is depolymerized and/or degraded into smaller molecules, such as monomers and/or oligomers and/or any degradation products.

According to the invention, "oligomers" refer to molecules containing from 2 to about 20 monomer units. As an example, oligomers retrieved from PET include methyl-2-hydroxyethyl terephthalate (MHET) and/or bis(2-hydroxyethyl) terephthalate (BHET) and/or 1-(2-Hydroxyethyl) 4-methyl terephthalate (HEMT) and/or dimethyl terephthalate (DMT). As another example, oligomers of lactic acid may be retrieved from PLA.

Within the context of the invention, the term "polyester" refers to a polymer that contain the ester functional group in their main chain. Ester functional group is characterized by a carbon bound to three other atoms: a single bond to a carbon, a double bond to an oxygen, and a single bond to an oxygen. The singly bound oxygen is bound to another carbon. According to the composition of their main chain, polyesters can be aliphatic, aromatic or semi-aromatic. Polyester can be homopolymer or copolymer. As an example, polyethylene terephthalate is a semi-aromatic copolymer composed of two monomers: terephthalic acid and ethylene glycol.

In the context of the invention, "crystalline polymers" or "semi-crystalline polymers" refer to partially crystalline polymers wherein crystalline regions and amorphous regions coexist. The degree of crystallinity of a semi-crystalline polymer may be estimated by different analytical methods and typically ranges from 10 to 90%. For instance, Differential Scanning Calorimetry (DSC) or X-Ray diffraction may be used for determining the degree of crystallinity of polymers. Other techniques are also suited for estimating with less reliability polymer's crystallinity, such as X-ray Scattering (XS) (including Small Angle and Wide Angle XS) and Infrared Spectroscopy. In the present disclosure, the degrees of crystallinity have been measured with DSC. More particularly, the DSC measures were conducted as follow: a small quantity of the sample (several mg) is heated at a constant heating rate, from ambient or sub-ambient temperature to a high temperature that is higher than the melting temperature (Tm) of the polyester. The heat flow data is collected and plotted against temperature. The degree of crystallinity Xc (%) is calculated as:

$$Xc(\%) = \frac{(\Delta Hf - \Delta Hcc)}{wt * \Delta Hf100\%} \times 100\%$$

where $\Delta H_f$ is the enthalpy of melting that can be determined by integrating the endothermic melting peak, $\Delta H_{cc}$ is the enthalpy of cold crystallization and determined by integrating the exothermic cold crystallization peak, $w_t$ the weight fraction of polyester in the plastic, and $\Delta H_{f,100\%}$ is the enthalpy of melting for a fully crystalline polymer and can be found in literature. As an example, $\Delta H_{f,100\%}$ of PET is taken from literature as 125.5 J/g (Polymer Data Handbook, Second Edition, Edited by James E. Mark, OXFORD, 2009). According to the literature, $\Delta H_{f,100\%}$ of PLA is equal to 93 J/g (Fisher E. W., Sterzel H. J., Wegner G., Investigation of the structure of solution grown crystals of lactide copolymers by means of chemical reactions, Kolloid Zeitschrift & Zeitschrift fur Polymere, 1973, 251, p 980-990).

The error margin of the degree of crystallinity is about 10%. Accordingly, a degree of crystallinity of about 25% corresponds to a degree of crystallinity between 22.5% and 27.5%.

In the context of the invention, "Tg", "Tc", and "Tm" respectively refer to the glass transition temperature, the crystallization temperature, and the melting temperature of a polymer. Such temperatures may be estimated by different analytical methods. For instance, Differential Scanning Calorimetry (DSC) or Differential thermal analysis (DTA) may be used for determining the Tg, Tc, and Tm of polymers. In the present disclosure, the Tg, Tc, and Tm of polymers disclosed correspond to temperatures measured with DSC.

Spinning Step

The inventors have shown that it is possible to improve the depolymerization rate of polymers contained in a plastic product, particularly polyesters and/or polyamides and/or polyolefins, by transforming the plastic product into fibers prior to submit the polymer(s) to depolymerization. The transformation of the plastic product into fibers (solid and/or hollow fibers, including filaments and/or non-woven) allows to increase the contact surface (i.e. contact area) between the plastic product (and thereby the polymers) and the depolymerizing agent. In other words, by increasing the contact surface between the plastic product and the depolymerizing agent, it is possible to increase the rate of depolymerization and/or to reduce the amount of depolymerizing agent and/or to reduce the time required to degrade the plastic product as compared to same plastic product which has not been spun.

As used herein, "spinning" refers to a shaping process leading to the production of polymer fibers. There are many types of spinning, including wet-spinning, dry-spinning (by solvent dissolution), dry jet-wet-spinning, melt-spinning, gel-spinning, and electrospinning. Spinning processes need spinnerets.

As used herein, the term "spinnerets" refers to a specific type of die principally used in fiber manufacture. It is usually a small metal plate having fine holes through which a spinning solution (streams of viscous or syrupy polymer, prepared by melting or chemically dissolving raw material) is forced and/or pulled, by pumping for example, to form fibers. They emerge from the spinneret as long fibers that are then solidified by coagulation, evaporation, or cooling. The size and shape of the spinneret holes determine the fiber's cross-sectional shape. Holes of the spinneret could be in various shapes: round, flat, trilobal, Y-shaped, octalobal, and the like. Depending on the type of spinneret used, either solid or hollow fibers can be formed. As an example, non-woven or filaments can be formed.

The invention particularly relates to process for degrading plastic products comprising at least one thermoplastic polymer.

In a particular embodiment, the spinning step is a melt-spinning step implemented with plastic in a partially or totally molten state. "Melt spinning" is classically used with polymers that can be melted (thermoplastic polymers such as polyamide, polyesters and/or polyolefins).

Generally speaking, molten plastic product is forced through the orifices of a spinneret and the resulting molten fibers solidify and harden upon being cooled by cooled fluid such as ambient stream of relatively cold air or other inert gas. In a particular embodiment, the plastic product is heated in an extruder to be in a partially or totally molten state.

In a particular embodiment, the molten plastic is extruded through spinneret at a temperature above the crystallization temperature (Tc) of a target polymer of the plastic product (i.e. polymer for which a degradation or depolymerization is intended), to form fibers. Preferably, the plastic product is submitted to a temperature at or above the melting temperature (Tm) of the target polymer of the plastic product. Even more preferably, the plastic product is submitted to a temperature between Tm+5° C. and Tm+25° C. of the target polymer, preferably between Tm+10° C. and Tm+25° C., more preferably between Tm+15° C. and Tm+25° C., such as Tm+20° C. of the target polymer. In another embodiment, the plastic product is submitted to a temperature between Tm+25° C. and Tm+50° C. of the target polymer. In another embodiment, the plastic product is submitted to a temperature corresponding to the Tm+50° C. of the target polymer or above.

According to an embodiment of the invention, the plastic product comprises several different polymers. Particularly, the plastic product comprises at least 51% by weight of a target polymer. In such case, the plastic product is advantageously submitted to a temperature at or above the Tc or to a temperature at or above the Tm of the target polymer. Alternatively, the plastic product is submitted to a temperature at or above the highest Tc or Tm of the polymers contained in the plastic product.

In a particular embodiment, the plastic product comprises PET, and the melt-spinning step comprises submitting the plastic product to a temperature above 170° C., preferably at or above 230° C. and more preferably to a temperature between 250° C. and 300° C. Even more preferably, the plastic product comprising PET is submitted to a temperature between 260° C. and 280° C.

In another embodiment, the plastic product comprising PET is submitted to a temperature at or above 300° C., preferably between 300° C. and 320° C.

In another particular embodiment, the plastic product comprises PLA, and the melt-spinning step comprises submitting the plastic product to a temperature above 110° C. and more preferably at or above 145° C. In a particular embodiment, the plastic product comprises PLLA, and the melt-spinning step comprises submitting the plastic product to a temperature at or above 170° C. In another embodiment, the plastic product comprises stereocomplex PLA and the melt-spinning step comprises submitting the plastic product to a temperature at or above 230° C.

According to the invention, the melt-spinning process is preferably implemented using an extruder and spinnerets. Advantageously, the extruder is selected from single-screw extruders, multi-screw extruders of either co-rotating or counter-rotating design, planetary roller extruder, dispersive kneaders, reciprocating single-screw extruder (co-kneaders), mini extruder or co-extruder. Preferably, the melt-spinning process further involves the use of a melt pump, a filter and distributor system. In a particular embodiment, the molten or partially molten plastic product is filtered before spinning step.

Advantageously, the spinnerets are selected from spinnerets for non-woven products or filaments. In a particular embodiment, the melt-spinning step is performed using spunbond spinnerets or meltblown spinnerets to produce spunbond or meltblown non-woven fibers.

In a particular embodiment, the spun plastic product is shaped into non-woven fibers that exhibit a porosity rate above 30%, preferably above 40%. In the context of the present invention, the porosity rate of non-woven fibers is calculated according to the equation below:

$$\text{Porosity } (\%) = 1 - \frac{\text{nonwoven grammage } \left[\frac{g}{m^2}\right]}{\text{material density} * \text{thickness } [\mu m]}$$

wherein the nonwoven grammage corresponds to the ratio weight of the filament on its surface (in grams per square meter), and the material density corresponds to the density of the plastic product before spinning. The thickness is determined according to the standard NWSP 120.6.

In another particular embodiment, the melt-spinning step is performed in an extruder comprising spinnerets for filaments. Particularly, such filaments are selected from monofilaments or multifilaments. In a preferred embodiment, the spinnerets produce filaments of diameter below 800 μm.

In a particular embodiment, the melt-spinning is performed with a co-extruder. The use of a co-extruder can be useful for producing bicomponent fibres, i.e. produced by spinning two different plastic products.

Cooling Step

According to an embodiment, the fibers (i.e. the spun plastic product) are cooled when they emerge from the spinnerets. Indeed, as exposed above, the melt-spinning is advantageously performed with a at least partially molten plastic that is forced through spinnerets. The fibers obtained are then submitted to a temperature cold enough to solidify the fibers. Classically, the cooling of the fibers can be performed with any cooling fluid, including cooling air and cooling liquid, preferably cooling air.

In a particular embodiment, the fibers are cooled less than 30 seconds after emerging from the spinnerets, more preferably less than 20 seconds, even more preferably less than 10 seconds. Preferably, the fibers are cooled immediately after emerging from the spinnerets (such as for filaments production). For meltblown production, the resulting fibers are going through high-velocity hot airstream and are then collected on a rotating drum or a forming belt at ambient temperature to cold the fibers and generate a nonwoven web.

Advantageously, the cooling is performed by submitting the fibers to a temperature below the Tc of the target polymer, preferably below the glass temperature (Tg) of said polymer.

Such fast cooling after a heating phase allows to amorphize at least one polymer in the fibers. The amorphization occurs during the heating of the plastic product, and the fast cooling at a temperature below Tc and/or Tg allows to fix the heated polymer in amorphous state. Amorphization advantageously improves the depolymerization ability of said polymer.

In a particular embodiment, a target polymer of the plastic product is amorphized during the melt-spinning step by heating the plastic product to a temperature above the Tc, preferably above the Tm of said polymer, when shaping the fibers and rapidly cooling the fibers obtained at a temperature below the Tc and/or the Tg of said polymer.

As used herein, the terms "amorphization" and "amorphizing", in connection with a polymer, refer to a decrease of the degree of crystallinity of a given polymer compared to its degree of crystallinity before amorphization. Preferably, amorphization allows to decrease the crystallinity of a target polymer of at least 5%, 10%, 15%, 20%, 25%, 30%, 35%, 40%, 50%, 60%, 70%, 80%, or 90% compared to before amorphization. Advantageously, the amorphization leads to polymer with at most 30% of crystallinity, preferably at most 25%, more preferably at most 20%, even more preferably at most 15% of crystallinity. Alternatively, amorphization allows to maintain the crystallinity of a polymer below 30%, preferably below 25%, more preferably below 20%, even more preferably below 15%. Amorphization thereby increases the depolymerization ability of said polymer by biological agents.

The temperatures of heating and cooling can be adapted by a person skilled in the art depending on the target polymer. Generally speaking, the plastic product can be submitted to a heat treatment and optionally shear stress for a period of time sufficient to obtain amorphization of the target polymer. For instance, such period of time may be comprised between 1 second and several minutes, depending on the temperature and/or the plastic product. In a preferred embodiment, the melt-spinning step is implemented with a plastic product that has been submitted to both shear stress and a temperature above the Tc of the target polymer of the plastic product, preferably at or above the Tm of said polymer. The heating and submission to shear stress are preferably performed simultaneously to increase amorphization.

In a particular embodiment, the cooling is performed by submitting the fibers to a temperature below the Tc of the target polymer of the plastic product, preferably below the Tg of said polymer. The submission to a temperature below the Tc of the target polymer of the plastic product is particularly adapted to PBAT for instance or to any polymer whose Tg is below 20° C. In another embodiment, the cooling is performed by submitting the fibers to a temperature at least 20° C. below the Tc of the target polymer, preferably less than at least 30° C., 40° C., 50° C. In an embodiment, the cooling is performed by submitting the fibers to room temperature (i.e. 25° C.+/−5° C.). In another embodiment, the cooling is performed by submitting the fibers to a temperature of about 20° C., or about 10° C.

Advantageously, the cooling may be performed by submitting the fibers to ambient air. For instance, the fibers are submitted to ambient air, whose temperature is between 15° C. and 30° C., preferably between 20° C. and 25° C. Alternatively, the fibers are submitted to chilled air, whose temperature is less than 14° C., preferably less than 10° C. or less than 5° C. Particularly, the process implements an air chiller. Alternatively, the fibers are submitted to air, whose temperature is below the Tc of the target polymer. More generally, any method suitable for rapidly reducing the temperature of the fibers may be used (e.g. cooling liquid). Alternatively, the cooling may be performed by immersing the fibers into a liquid at the cooling temperature, right after shaping.

Generally speaking, the fibers are submitted to the cooling temperature for a period of time sufficient to decrease their temperature. For instance, such period of time may be comprised between less than 1 second and several minutes, depending on the throughput, the temperature of the fibers released from the spinnerets, and/or the cooling temperature and/or the diameter of the fibers. Particularly, the fibers are submitted to the cooling temperature for less than 1 minute, preferably for less than 30 seconds, more preferably for less than 20 seconds, even more preferably for less than 10 seconds, for less than 7 seconds, for less than 5 seconds, for about 1 second. The duration of cooling as well as air flow rate will be easily adapted by the person skilled in the art to obtain solid filaments and/or non-wovens.

It is therefore an object of the invention to provide a process for degrading a plastic product comprising at least one polymer, comprising the steps of:

a. Submitting said plastic product to a melt-spinning for shaping fibers, by heating the plastic product at a temperature above the crystallization temperature (Tc) of a target polymer of said plastic product, preferably above the melting temperature (Tm) of the target polymer; wherein the cooling of the resulting fibers is performed at a temperature below the Tc of said target polymer, preferably below the Tg of said polymer, and b. Depolymerizing at least said target polymer.

Advantageously, the melt-spinning is performed implementing an extruder and spinnerets, and the resulting fibers are submitted to ambient and/or chilled air.

In a particular embodiment, the plastic product comprises PET, the melt-spinning step is performed implementing an extruder at a temperature above 170° C., preferably at or above 230° C., wherein the cooling of the resulting fibers is performed at a temperature below 100° C., preferably below 90° C. Alternatively, the cooling of the fibers is performed by submitting said fibers to a temperature below 50° C.

In a particular embodiment, after the melt-spinning step, the target polymer in the fibers is at least partially amorphized and exhibits a crystallinity rate of at most 30%, preferably at most 25%, more preferably at most 20%, after cooling. Particularly, the polymer is PET and the PET in the fibers exhibits a crystallinity rate of at most 30%, preferably at most 25%, more preferably at most 20%.

Particularly, it is an object of the invention to provide a process for degrading a plastic product comprising at least PET, comprising the steps of:

a. Submitting said plastic product to melt-spinning at a temperature above 170° C., preferably above 185° C., more preferably above 200° C., even more preferably at or above 230° C., wherein the cooling of the resulting fibers is performed at a temperature below 100° C., preferably below 90° C.;

b. Depolymerizing PET of said fibers.

Advantageously, the melt-spinning step is performed at a temperature above 240° C., 245° C., 250° C., 255° C., 260° C., 265° C., and the cooling is performed less than 30 seconds after the melt-spinning, preferably immediately after.

Preferably, the depolymerizing step is performed using an esterase, more preferably a cutinase.

In a particular embodiment, the plastic product is foamed before to be shaped into fibers. For instance, the plastic product is foamed within the extruder before to be forced through the spinnerets. Foaming may be performed with physical foaming agents, preferably selected from gas, more preferably selected from the group consisting in nitrogen, carbon dioxide, methane, helium, neon, argon, xenon, hydrogen or mixture thereof, and/or with chemical foaming agents, preferably selected from the group consisting in citric acid, carbonate or mixture thereof.

It is therefore another object of the invention to provide a process for degrading a plastic product comprising at least one polymer, comprising the steps of:

a. Foaming and melt-spinning said plastic product by use of an extruder comprising spinneret to form foamed fibers, wherein the extrusion is performed at a temperature above the crystallization temperature (Tc) of the target polymer of said plastic product, preferably above the melting temperature (Tm) of said polymer; and wherein the cooling of said foamed fibers is performed at a temperature below the Tc of the target polymer, preferably below the Tg of said polymer b. Depolymerizing said target polymer of said fibers.

Advantageously, the foaming is performed by submitting the plastic product to a chemical foaming agent and/or the fibers are cooled immediately after the melt-spinning, preferably by submission to ambient and/or chilled air.

Depolymerization Step

According to the invention, the degrading process comprises a step of depolymerization of at least one polymer of the spun plastic product (i.e. the fibers). According to a preferred embodiment, the depolymerizing step targets at least one polymer that has been previously amorphized.

In a particular embodiment, the spun plastic product is cut into smaller pieces before the depolymerization step.

In a particular embodiment, the depolymerizing step comprises contacting the spun plastic product with a depolymerizing agent, i.e. a chemical and/or a biological agent. In a particular embodiment, the depolymerization step is performed in a liquid medium comprising the depolymerizing agent.

In another particular embodiment, the plastic product is contacted with a depolymerizing agent before the depolymerization step. For instance, the fibers are immersed, after the spinning step and/or the cooling step, in a liquid comprising the depolymerizing agent. Particularly, the fibers may be contacted with the depolymerizing agent during the cooling step (e.g. the fibers are immersed in a cooling liquid comprising a depolymerizing agent and/or the depolymerizing agent is sprayed on the fibers during cooling with cold and/or ambient air). Alternatively, the fibers may be contacted with the depolymerizing agent after the cooling step with air, by immersing the cooled fibers in a liquid comprising a depolymerizing agent. If required, the fibers may be dried before the depolymerizing step. The depolymerization step may be performed later, by immersing the fibers in a liquid, which is preferably deprived of depolymerizing agent. Alternatively, the depolymerization step is implemented later by submitting the spun plastic product to composting conditions. Particularly, the spun plastic product is submitted to industrial compost conditions at a temperature above 50° C., and/or to domestic compost conditions at a temperature between 15° C. and 35° C. Alternatively, the depolymerization step is implemented later, by submitting the spun plastic product to stimuli able to activate the depolymerizing agent. For instance, the depolymerizing agent is a degrading enzyme and the stimuli consist in specific temperature and/or humidity rate.

It is therefore an object of the invention to provide a process for degrading a plastic product comprising at least one polymer, comprising the steps of:

a. Melt-spinning said plastic product to produce fibers of said plastic, wherein the melt-spinning step is performed at a temperature above the crystallization temperature (Tc) of the target polymer of the plastic product, preferably above the melting temperature (Tm) of said polymer; and the cooling of said spun plastic product is performed by contacting the fibers with air at a temperature below the Tc of said target polymer, preferably below the Tg of said polymer;

b. Contacting the cooled fibers with a liquid comprising the depolymerizing agent; and c. Depolymerizing at least partially the target polymer by contacting the fibers with a liquid, which advantageously is deprived of depolymerizing agent.

In a particular embodiment, the depolymerizing agent is or comprises a biological agent.

Particularly, the biological agent is a depolymerase (i.e. an enzyme). Preferably, the depolymerase is able to degrade at least one polymer of the plastic product, preferably at least a polymer that has been previously amorphized.

The depolymerase is advantageously selected from the group consisting of a cutinase, a lipase, a protease, a carboxylesterase, a p-nitrobenzylesterase, an esterase, a scl-PHA depolymerase, a mcl-PHA depolymerase, a PHB depolymerase, an amidase, aryl-acylamidase (EC 3.5.1.13), oligomer hydrolase, such as 6-aminohexanoate cyclic dimer hydrolase (EC 3.5.2.12), 6-aminohexanoate dimer hydrolase (EC 3.5.1.46), 6-aminohexanoate-oligomer hydrolase (EC 3.5.1.B17), oxidase, peroxidase, laccase (EC 1.10.3.2), oxygenase, lipoxygenase, mono-oxygenase, or lignolytic enzyme. In a particular embodiment, the plastic product is contacted with at least two different depolymerases.

In a particular embodiment, the plastic product comprises PET, and the depolymerase is an esterase. Particularly, the depolymerase is a cutinase, preferably a cutinase produced by a microorganism selected from *Thermobifida cellulosityca, Thermobifida halotolerans, Thermobifida fusca, Thermobifida alba, Bacillus subtilis, Fusarium solani pisi, Humicola insolens, Sirococcus conigenus, Pseudomonas mendocina* and *Thielavia terrestris*, or any functional variant thereof. In another embodiment, the cutinase is selected from a metagenomic library such as LC-Cutinase described in Sulaiman et al., 2012 or the esterase described in EP3517608, or any functional variant thereof including depolymerases listed in WO 2018/011284 or WO 2018/011281. In another particular embodiment, the depolymerase is a lipase preferably produced by *Ideonella sakaiensis*. In another particular embodiment, the depolymerase is a cutinase produced by *Humicola insolens*, such as the one referenced A0A075B5G4 in Uniprot or any functional variant thereof. In another embodiment, the depolymerase is selected from commercial enzymes such as Novozym 51032 or any functional variant thereof.

In a particular embodiment, the plastic product comprises PLLA, and the depolymerase is a protease, preferably produced by a microorganism selected from *Amycolatopsis* sp., *Amycolatopsis orientalis, Tritirachium album* (proteinase K), *Actinomadura keratinilytica, Laceyella sacchari LP*175, *Thermus* sp. or any commercial enzymes known for degrading PLA such as Savinase®, Esperase®, Everlase® or any functional variant thereof including depolymerases listed in WO 2016/062695, WO 2018/109183 or WO 2019/122308.

In another particular embodiment, the plastic product comprises PDLA, and the depolymerase is an esterase, preferably a cutinase or a lipase more preferably selected from CLE from *Cryptococcus* sp., lipase PS from *Burkholderia cepacia, Paenibacillus amylolyticus* TB-13, *Candida Antarctica, Rhiromucor miehei, Saccharomonospora viridis, Cryptococcus magnus* or any functional variant thereof.

In another particular embodiment, the plastic product comprises PA and the depolymerase is selected from the group consisting of amidase, aryl-acylamidase (EC 3.5.1.13), oligomer hydrolase, such as 6-aminohexanoate cyclic dimer hydrolase (EC 3.5.2.12), 6-aminohexanoate dimer hydrolase (EC 3.5.1.46), 6-aminohexanoate-oligomer hydrolase (EC 3.5.1.B17).

In another particular embodiment, the plastic product comprises polyolefin and the depolymerase is an oxidase preferably selected from the group consisting of laccase, peroxidase, oxygenase, lipoxygenase, mono-oxygenase or lignolytic enzyme.

In another embodiment, the depolymerization agent is a microorganism that expresses and excretes the depolymerase. Said microorganism may naturally synthesize the depolymerase, or it may be a recombinant microorganism, wherein a recombinant nucleotide sequence encoding the depolymerase has been inserted, using for example a vector. Particular embodiments of the depolymerizing step can be found in WO 2017/198786.

According to the invention, several microorganisms and/or purified enzymes and/or synthetic enzymes may be used together or sequentially to depolymerize different polymers contained in a same plastic product or in different plastic products submitted simultaneously to the degrading process of the present invention.

The time required for depolymerizing at least one polymer of the plastic article may vary depending on the plastic article and/or the target polymer (e.g., nature and origin of the plastic article, its composition, shape, molecular weight, etc.), the type and amount of microorganisms/enzymes used, as well as various process parameters (i.e., temperature, pH, additional agents, etc.). One skilled in the art may easily adapt the process parameters to the plastic articles and/or depolymerases.

In a particular embodiment, the plastic product comprises PET, and the depolymerization step is implemented by contacting the plastic product with a biological depolymerization agent at a temperature comprised between 20° C. and 90° C., preferably between 30° C. and 80° C., more preferably between 40° C. and 75° C., more preferably between 50° C. and 75° C., even more preferably between 60° C. and 75° C. Furthermore, the depolymerization step is preferably implemented at a pH between 5-11, preferably between 7-9, more preferably between 7-8.5, even more preferably between 7-8. Alternatively, the depolymerization step may be implemented under industrial and/or composting conditions.

In a particular embodiment, the plastic product comprises PLA, and the depolymerization step is implemented by contacting the plastic product with a biological depolymerization agent at a temperature comprised between 20° C. and 90° C., preferably between 20° C. and 60° C., more preferably between 30° C. and 55° C., more preferably from 40° C. to 50° C., even more preferably at 45° C. Furthermore, the depolymerization step is preferably implemented at a pH between 5-11, preferably between 7-10, more preferably between 8.5-9.5, even more preferably between 8-9. In another particular embodiment, the depolymerization step may be implemented at a pH between 7 and 8. Alternatively, the depolymerization step may be implemented under industrial and/or composting conditions.

In another particular embodiment, the depolymerizing agent is or comprises a chemical agent. Particularly, the chemical agent is a catalyst selected from metallic catalysts or stables and not toxic hydrosilanes (PMHS, TMDS) such as commercially available $B(C6F5)3$ and $[Ph3C+,B(C6F5)4−]$ catalysts. Particularly, the catalyst is selected from alkoxide, carbonate, acetate, hydroxide, alkaline metal oxide, alkaline earth metal, calcium oxide, calcium hydroxide, calcium carbonate, sodium carbonate, iron oxide, zinc acetate, zeolite. In some embodiments, the catalyst used in the depolymerization process of the present invention comprises at least one of germanium compounds, titanium compounds, antimony compounds, zinc compounds, cadmium compounds, manganese compounds, magnesium compounds, cobalt compounds, silicon compounds, tin compounds, lead compounds, and aluminum compounds. Particularly, the catalyst comprises at least one of germanium dioxide, cobalt acetate, titanium tetrachloride, titanium phosphate, titanium tetrabutoxide, titanium tetraisopropoxide, titanium tetra-n-propoxide, titanium tetraethoxide, titanium tetramethoxide, a tetrakis(acetylacetonato)titanium complex, a tetrakis(2,4-hexanedionato)titanium complex, a tetrakis(3,5-heptanedionato)titanium complex, a dimethoxybis(acetylacetonato)titanium complex, a diethoxybis(acetylacetonato)titanium complex, a diisopropoxybis(acetylacetonato)titanium complex, a di-n-propoxybis(acetylacetonato)titanium complex, a dibutoxybis(acetylacetonato)titanium complex, titanium dihydroxybisglycolate, titanium dihydroxybisglycolate, titanium dihydroxybislactate, titanium dihydroxybis(2-hydroxypropionate), titanium lactate, titanium octanediolate, titanium dimethoxybistriethanol aminate, titanium diethoxybistriethanol aminate, titanium dibutoxybistriethanol aminate, hexamethyl dititanate, hexaethyl dititanate, hexapropyl dititanate, hexabutyl dititanate, hexaphenyl dititanate, octamethyl trititanate, octaethyl trititanate, octapropyl trititanate, octabutyl trititanate, octaphenyl trititanate, a hexaalkoxy dititanate, zinc acetate, manganese acetate, methyl silicate, zinc chloride, lead acetate, sodium carbonate, sodium bicarbonate, acetic acid, sodium sulfate, potassium sulfate, zeolites, lithium chloride, magnesium chloride, ferric chloride, zinc oxide, magnesium oxide, calcium oxide, barium oxide, antimony trioxide, and antimony triacetate. Alternatively, the catalyst is selected from nanoparticules. The chemical agent can be selected from any catalyst known by a person of the art for having the capacity to degrade and/or depolymerize the target polymer.

Alternatively, the chemical agent is an acid or a base catalyst that is able to break polymer bonds, particularly esters bonds. Particularly, the chemical agent involved in breaking of esters bonds is a mixture of hydroxide and an alcohol that can dissolve the hydroxide. The hydroxide is selected from alkali metal hydroxide, alkaline-earth metal hydroxide, and ammonium hydroxide, preferably selected from sodium hydroxide, potassium hydroxide, calcium hydroxide, lithium hydroxide, magnesium hydroxide, ammonium hydroxide, tetra-alkyl ammonium hydroxide and the alcohol is selected from linear, branched, cyclic alcohol or a combination thereof, preferably linear C1-C4 alcohol selected from methanol, ethanol, propanol, butanol.

In a particular embodiment, the chemical agent is a mixture of a non-polar solvent able to swell the polymer (i.e., swelling agent) and an agent that can break or hydrolyze ester bonds, wherein the swelling agent is preferably a chlorinated solvent selected from dichloromethane, dichloroethane, tetrachloroethane, chloroform, tetrachloromethane and trichloroethane. In another particular embodiment, the chemical agent is an acid selected from ethylene glycol, hydrochloric acid, sulfuric acid or a Lewis acid.

Target Plastic Articles

The inventors have developed a degrading process for degrading plastic products comprising polymers, preferably comprising thermoplastic polymers such as polyesters and/or polyamides and/or polyolefins. The process of the invention may be advantageously used with plastic articles from plastic waste collection and/or post-industrial waste. More particularly, the process of the invention may be used for degrading domestic plastic wastes, including plastic bottles, plastic trays, plastic bags and plastic packaging, soft and/or hard plastics, even polluted with food residues, surfactants, etc. Alternatively, or in addition, the process of the invention may be used for degrading used plastic fibers, such as fibers providing from fabrics, textiles and/or and industrial wastes. More particularly, the process of the invention may be used with PET plastic and/or PET fiber waste, such as PET fibers providing from fabrics, textile, or tires. Interestingly, the process of the invention allows the production of monomers and/or oligomers and/or any degradation products that may be further recovered and/or reprocessed.

In a particular embodiment, the plastic product is selected from rigid or flexible plastic wastes, including plastic bottles, plastic trays, plastic bags and plastic packaging, soft and/or hard plastics, i.e. from plastic wastes that are not shaped as fiber, and/or from crystalline plastic fibers, particularly from crystalline plastic fibers comprising thermoplastic polymers (such as yarn, filaments, braid, rope, fabric and non-woven).

In a particular embodiment, the process of the invention is used for degrading a plastic product comprising at least one thermoplastic polymer, particularly one semi-crystalline thermoplastic polymer.

Advantageously, the process of the invention is used for degrading a plastic product comprising at least one polyester selected from polyethylene terephthalate (PET); polytrimethylene terephthalate (PTT); polybutylene terephthalate (PBT); polyethylene isosorbide terephthalate (PEIT); polylactic acid (PLA); polyhydroxyalkanoate (PHA); polybutylene succinate (PBS), polybutylene succinate adipate (PBSA), polybutylene adipate terephthalate (PBAT), polyethylene furanoate (PEF), polycaprolactone (PCL), poly(ethylene adipate) (PEA), polyethylene naphthalate (PEN), polycyclohexylenedimethylene terephthalate (PCT), poly ethylene succinate (PES), poly (butylene succinate-co-terephtalate) (PBST), poly(butylene succinate/terephthalate/ isophthalate)-co-(lactate) (PBSTIL) and blends/mixtures of these polymers. Particularly, the process of the invention is used for degrading a plastic product comprising at least one aromatic polyester selected from polyethylene terephthalate (PET); polytrimethylene terephthalate (PTT); polybutylene terephthalate (PBT); polyethylene isosorbide terephthalate (PEIT); polybutylene adipate terephthalate (PBAT), polyethylene furanoate (PEF), and blends/mixtures of these polymers.

In a particular embodiment, the process of the invention is used for degrading a plastic product comprising at least one polyester, and preferably at least PET or PLA.

Alternatively, the process of the invention is used for degrading a plastic product comprising at least one polyamide selected from polyamide-6 or poly(β-caprolactam) or polycaproamide (PA6), polyamide-6,6 or poly(hexamethylene adipamide) (PA6,6), poly(11-aminoundecanoamide) (PA11), polydodecanolactam (PA12), poly(tetramethylene adipamide) (PA4,6), poly(pentamethylene sebacamide) (PA5,10), poly(hexamethylene azelaamide) (PA6,9), poly (hexamethylene sebacamide) (PA6,10), poly(hexamethylene dodecanoamide) (PA6,12), poly(m-xylylene adipamide) (PAMXD6), polyhexamethylene adipamide/polyhexamethyleneterephtalamide copolymer (PA66/6T), polyhexamethylene adipamide/polyhexamethyleneisophtalamide copolymer (PA66/6I) and blends/mixtures of these materials.

Alternatively, the process of the invention is used for degrading a plastic product comprising at least one polyolefin selected from polyethylene, polypropylene, polymethylpentene, polybutene-1, polyisobutylene, ethylene propylene rubber, ethylene propylene diene monomer rubber, ethylene vinyl alcohol, ethylene-carbon monoxide copolymer and copolymers and modifications thereof.

In a particular embodiment, the plastic product comprises at least two different polymers. More generally, the plastic products targeted by the process of the invention may comprise different kinds of polymers, including synthetic polymers, derived from petrochemicals such as polyamides, polyolefins or vinyl polymers, or biobased sourced such as rubber, wood or wood compounds such as lignin, cellulose or hemi-cellulose, and starch and derivatives thereof. Alternatively, the plastic product may comprise at least one polymer and an additional component such as metal compounds, mineral compounds, glass compounds, natural or synthetic fibers (such as glass fibers or carbon fibers), paper, and derivatives thereof as defined in WO 2015/173265.

Interestingly, the process of the invention allows to produce monomers and/or oligomers and/or degradation products that may be further recovered and/or reprocessed.

Production of Monomers/Oligomers/Degradation Products

It is also another object of the invention to provide a method of producing monomers and/or oligomers and/or any degradation products from a plastic product comprising at least one polymer, comprising successively submitting said plastic product to melt-spinning and cooling the resulting fibers, and then depolymerizing at least one target polymer in the fibers.

It is also another object of the invention to provide a process of degrading a plastic article comprising at least one polymer, wherein the plastic product has been previously spun, the polymer of said plastic product has been optionally at least partially amorphized and wherein the plastic product is contacted with a depolymerizing agent able to degrade said polymer, preferably a biological agent, more preferably a depolymerase. In a particular embodiment, the plastic product is depolymerized under composting conditions or under environmental conditions. Particularly, the plastic product is submitted to industrial compost conditions at a temperature above 50° C., and/or to domestic compost conditions at a temperature between 15° C. and 35° C. In such case, the polymer of the plastic product may be degraded up to water and/or carbon dioxide and/or methane by microorganisms in the compost and/or in the environment.

It is a further object of the invention to provide a process for degrading a plastic product selected from rigid or flexible plastic wastes and/or from crystalline plastic fibers comprising at least one polymer and wherein the plastic product has been previously spun, said process comprising a step of depolymerizing wherein said plastic product is contacted with a depolymerizing agent able to degrade said polymer, preferably a biological agent, more preferably a depolymerase. In an embodiment, said polymer of said plastic product has been submitted to an amorphizing step prior to the depolymerisation step. In a particular embodiment, the process of degrading a plastic product and/or the method of producing monomers/oligomers further comprises a step of purifying monomers and/or oligomers and/or degradation products resulting from the step of depolymerization. Said monomers and/or oligomers and/or degradation products may be recovered, sequentially or continuously. A single type of monomer and/or oligomers or several different types of monomers and/or oligomers may be recovered, depending on the polymers and/or the starting plastic articles. The recovered monomers and/or oligomers and/or degradation products may be purified, using all suitable purifying method and conditioned in a re-polymerizable form. In a preferred embodiment, the repolymerizable monomers and/or oligomers may then be reused to synthesize polymers. One skilled in the art may easily adapt the process parameters to the monomers/oligomers and the polymers to synthesize.

It is a further object of the invention to provide a method for recycling a plastic product selected from rigid or flexible plastic wastes and/or from crystalline plastic fibers and comprising at least one polymer, comprising subjecting successively said plastic product to a melt-spinning step and a depolymerization step, and recovering monomers and/or oligomers of such polymer. Preferably the depolymerizing agent is a biological agent, more preferably a depolymerase suitable to degrade said polymer of said plastic product.

It is thus an object of the invention to use a spun plastic product comprising at least one polymer to produce monomer and/or oligomers of such polymer, by submitting said spun plastic product to a depolymerisation step, preferably by use of a depolymerizing agent selected from biological agents, more preferably a depolymerase.

The embodiments previously described in connection with processes of degradation also apply to methods of producing monomers/oligomers and method for recycling plastic products and to the methods of recycling.

Biodegradable Plastic Production

It is another object of the invention to provide a plastic product comprising at least one polymer and incorporating at least one enzyme able to degrade said polymer, wherein the enzyme has been incorporated in the plastic product according to the following process:

a. Melt-spinning said plastic product, wherein the melt-spinning step is performed at a temperature above the Tc, preferably above the Tm of said polymer, and wherein the cooling of the resulting fibers is performed less than 30 seconds after the melt-spinning step, preferably immediately after the melt-spinning step, by submitting the fibers to cooling air at a temperature below the Tc and/or the Tg of said polymer b. Submitting the resulting cooled fibers to a liquid comprising a depolymerizing agent, advantageously selected from depolymerases.

Further aspects and advantages of the invention will be disclosed in the following examples, which should be considered as illustrative and do not limit the scope of this application. These Examples provide experimental data supporting the invention and means of performing the invention.

EXAMPLES

Example 1—Process of Degrading a Plastic Product Containing PET Comprising a Meltblown Spinning Step Meltblown Spinning Step Colored and washed flakes from PET bottles comprising 98% of PET were extruded to obtain pellets using a Intarema 1108TE extruder equipped with a melt filter SC_4_134_RTF with filter area of 564 cm$^2$. Pelletizing was carried out using an ECON UWP EUP 150 underwater pelletizer with a die containing 8 holes of 2.9 mm diameter each. Extrusion temperatures range from 265° C. to 285° C. and a screw speed of 155 rpm was used.

Some of pellets have been used as control (C1) and other pellets have been dried at 80° C. for 6 hours and used for melt-spinning step (non-woven manufacturing).

The meltblown spinning machine is from Hills Inc (FL, USA) and is described in Table 1.

TABLE 1

| Characteristics of the meltblown spinning machine | |
| --- | --- |
| Extruders | A: 1" ½-L/D ratio = 30:1 |
| | B: 1" ¼-L/D ratio = 30:1 |
| Melt Pumps | A: 8 cc/rev |
| | B: 8 cc/rev |
| Air heater temperature | Up to 300° C. |
| Air speed | Up to 600 m/sec |
| Spinneret hole density | 35 holes per inch |
| Hole diameter | 0.25 mm |
| Distance die to collector (DCD) | From 10 to 1000 mm |

Parameters used for nonwoven production by melt-spinning and their main properties are summarized in Table 2.

TABLE 2

| | | | | | Process parameters Meltblown | | | | | |
|---|---|---|---|---|---|---|---|---|---|---|
| | Material | | Melt | Melt | Throughput | | Air | Air | Air | |
| Sample | Circuit A PET | Circuit B PET | temperature A [° C.] | temperature B [° C.] | per hole [g/min] | DCD [mm] | temperature [° C.] | gap [mm] | pressure [bars] | |
| S1 | 50% | 50% | 295 | 310 | 0.16 | 80 | 303 | 0.040 | 0.13 | |
| S2 | 50% | 50% | 295 | 310 | 0.16 | 80 | 303 | 0.040 | 0.13 | |

| | Process parameters Meltblown | | | Average Single | | Air | | | |
|---|---|---|---|---|---|---|---|---|---|
| Sample | Air speed [%] | Air speed [m/sec] | Line speed [mpm] | filament diameter* [μm] | Average grammage [gsm] | Thickness 0.5 kPa-25 cm² [mm] | permeability 200 Pa-20 cm² [l/m²/sec] | Porosity [%] | |
| S1 | 44% | 68 | 7.6 | 5 | 24.30 | 0.253 | 1 823 | 93.0% | |
| S2 | 44% | 68 | 20.0 | 5 | 10.24 | 0.163 | 4 133 | 95.5% | |

*estimated using a microscope

Fibers emerging from the spinning machine are cooled by ambient air (between 20-25° C.). Crystallinity level of S1 and S2 are about 13% and 12% respectively.

Porosity level of the non-woven product is estimated based on the equation below:

$$\text{Porosity (\%)} = 1 - \frac{\text{nonwoven grammage}\left[\frac{g}{m^2}\right]}{\text{material density} * \text{thickness [μm]}}$$

wherein the nonwoven grammage corresponds to the ratio weight of the filament on its surface (in grams per square meter), and the material density corresponds to the density of the plastic product before spinning. The thickness is determined according to the standard NWSP 120.6.

The second control (C2) was produced by micronizing some of C1 pellets using a disc pulverizer equipped with a 50 μm screen to obtain a fine powder with particle size distribution as defined hereinafter: D(10)=138 μm; D(50): 326 μm; D(90): 651 μm.

A) Depolymerization in Glass Bottle

The depolymerization process was carried out using a variant of LC-cutinase (Sulaiman et al., Appl Environ Microbiol. 2012 March). Such variant (LCC-ICCIG) corresponding to the enzyme of SEQ ID NO: 1 with the following mutations F208I+D203C+S248C+V170I+Y92G was expressed as recombinant protein in Trichoderma reesei.

For depolymerization test, spun samples S1 and S2 were cut with scissors into small pieces of 2*2 cm approximately.

For each sample (S1, S2, C1 and C2), 100 mg were respectively weighted and introduced in a 250 ml glass bottle containing 49 mL of 0.1 M potassium phosphate buffer (pH 8). The depolymerization was started after the addition of 1 mL of enzymatic solution at 0.1 mg/mL in 0.1 M potassium phosphate (pH 8) by incubating each sample at 60° C. and 150 rpm in a Multitron pro (Infors HT, Switzerland).

The depolymerization rate of PET was determined via regular sampling. The samples were analyzed by Ultra High Performance Liquid Chromatography (UHPLC) for measuring the amount of terephthalic acid equivalent produced according to the method described herein.

The AT equivalent concentration was determined by chromatography (UHPLC). If necessary, the samples were diluted in 100 mM potassium phosphate buffer, pH 8.1 mL of samples or diluted samples were mixed with 1 mL of methanol and 100 μL of 6 N HCl. After homogenization and filtration through a 0.45 μm syringe filter, 20 μL of sample were injected into the UHPLC, Ultimate 3000 UHPLC system (Thermo Fisher Scientific, Waltham, MA) including a pump module, a sampler automatic, a column thermostated at 25° C. and a UV detector at 240 nm. The terephthalic acid (AT) and the produced oligomers (MHET and BHET) were separated using a gradient of methanol (30% to 90%) in 1 mM H2SO4 at 1 m/min through a HPLC Discovery HS C18 column (150 mm×4.6 mm, 5 μm) equipped with a precolumn (Supelco, Bellefonte, PA). AT, MHET and BHET were measured according to standard curves prepared from commercially available AT and BHET and internally synthesized MHET. The AT equivalent is the sum of the measured TA and the TA equivalent in the measured MHET and BHET. The percentage of hydrolysis of samples was calculated based on the total amount of TA equivalent (TA+MHET+BHET) at a given time versus the total amount of TA determined in the initial sample. Results of percentage of depolymerization after 6 h and 9 h are shown in Table 3 below.

TABLE 3

PET depolymerization rate of a spun plastic product comprising PET (S1 and S2) compared to plastic products that have not been submitted to a spinning process (C1 and C2 (micronized)).

| | Depolymerization level (%) | |
|---|---|---|
| Sample | 6 h | 9 h |
| C1 | 0.1 | 0.1 |
| C2 | 22.7 | 51.8 |
| S1 | 40.1 | 79.4 |
| S2 | 46.7 | 82.5 |

The results show that a melt-spinning step enables to significantly increase the percentage of depolymerization of PET of a spun plastic product compared to an extruded (not spun) plastic product (C1). Moreover, the results also show that the melt-spinning step enables to increase from at least 50% the percentage of depolymerization of PET of a spun plastic product compared to the extruded (not spun) and micronized plastic product (C2).

Example 2—Process of Degrading a Plastic Product Containing PET Comprising a Multifilament Production Step A) Multifilament Production Step Colored and washed flakes from PET bottles comprising 95% of PET were extruded with the same extruder as for Example 1-A. Some pellets from this step with crystallinity level of 16% were used as a control (called C3). Other pellets were dried at 140° C. for 4 hours before extrusion spinning.

The spinning machine used for multifilament production was a Hills Inc (FL, USA) machine equipped with a single screw extruder 19 mm (¾") with L/D ratio 30:1 composed of 3 zones. Melt spinning process comprises a melt pump and a multifilament spinneret with 36 holes with 0.6 mm diameter each hole, a take-up roll (R1), a draw roll (R2) and a relax roll (R3) and a winder.

Temperatures used for extrusion from first extruder zone to the spinneret were 265° C.-270° C.-280° C.-280°

C.-280C°. Temperatures in rolls R1-R2-R3 were set to 95° C.-100° C.-50° C. The other parameters are listed in Table 4 below.

TABLE 4

| Parameters of multifilament melt spinning step | | | | | | | |
|---|---|---|---|---|---|---|---|
| Flow per hole | Pump speed | Spinning pressure | Roll speed (m/min) | | | Draw | Filament Diameter |
| | | | R1 | R2 | R3 | | |
| (g/min) | (rpm) | (bars) | | | | ratio | (μm) |
| 0.8 | 41.7 | 103 | 1600 | 1700 | 1710 | 1.06 | 20.8 |

Multifilaments were cooled by ambient air, wound on spools, and cut into staple fibers of 12 mm of length (sample S3). Its crystallinity level is 9%.

B) Depolymerization in Glass Bottle

Depolymerization of samples S3 and C3 was conducted in the same conditions as in Example 1-B. After 23 hours, S3 has shown 80% of depolymerization, whereas the control C3 shows less than 2% of depolymerization.

The results show that a melt-spinning step enables to increase the depolymerization rate of PET of a spun plastic product compared to an unspun and extruded plastic product.

The invention claimed is:

1. A process for degrading a plastic product comprising at least one thermoplastic polymer, the process comprising:
   a) submitting the plastic product to a spinning step to obtain fibers of said plastic product, wherein the spinning step comprises a melt-spinning step implemented with a plastic product in a partially or totally molten state, wherein the melt plastic product is extruded through spinnerets for non-woven products into fibers and wherein the fibers obtained exhibit a porosity rate above 30%; and
   b) depolymerizing at least one thermoplastic polymer of said fibers by contacting said fibers with a biological depolymerizing agent.

2. The process of claim 1, wherein the melt-spinning step is performed at a temperature above the crystallization temperature (Tc) of at least one thermoplastic polymer of the plastic product.

3. The process of claim 1, wherein the fibers are cooled by submitting said fibers to a temperature below the crystallization temperature (Tc) of at least one target thermoplastic polymer of the plastic product.

4. The process of claim 3, wherein the target thermoplastic polymer in said fibers exhibits after cooling a crystallinity rate of at most 30%.

5. The process of claim 1, wherein the biological depolymerizing agent is a depolymerase.

6. The process of claim 1, wherein the biological depolymerizing agent is a depolymerase able to degrade at least one thermoplastic polymer of the plastic product.

7. The process of claim 1, further comprising a step of recovering and optionally purifying oligomers and/or monomers resulting from the depolymerization step.

8. The process of claim 1, wherein the at least one thermoplastic is a polyester selected from polyethylene terephthalate (PET), polytrimethylene terephthalate (PTT), polybutylene terephthalate (PBT), polyethylene isosorbide terephthalate (PEIT), polylactic acid (PLA), polyhydroxy alkanoate (PHA), polybutylene succinate (PBS), polybutylene succinate adipate (PBSA), polybutylene adipate terephthalate (PBAT), polyethylene furanoate (PEF), polycaprolactone (PCL), poly(ethylene adipate) (PEA), polybutylene succinate terephthalate (PBST), polyethylene succinate (PES), poly(butylene succinate/terephthalate/isophthalate)-co-(lactate) (PBSTIL) and blends/mixtures of these materials.

9. A process for degrading a plastic product comprising at least PET comprising the steps of:
   a) submitting said plastic product to melt-spinning at a temperature above 170° C., said melt-spinning being implemented with a plastic product in a partially or totally molten state, wherein the melt plastic product is extruded through spinnerets for non-woven products and wherein fibers obtained from said melt-spinning exhibit a porosity rate above 30%, and cooling the resulting fibers at a temperature below 100° C.;
   b) depolymerizing PET in said fibers by contacting said fibers with a biological depolymerizing agent; and optionally
   c) recovering and optionally purifying oligomers and/or monomers resulting from depolymerization of said PET.

10. The process of claim 9, wherein the depolymerizing step is performed by contacting the fibers with a depolymerase or a cutinase.

11. A method of producing monomers and/or oligomers and/or degradation products from a plastic product comprising at least one thermoplastic polymer, comprising submitting successively the plastic product to a spinning step comprising a melt-spinning step implemented with the plastic product in a partially or totally molten state, wherein the melt plastic product is extruded through spinnerets for non-woven products and wherein extruded fibers obtained in said melt-spinning step exhibit a porosity rate above 30%, and to a depolymerizing step comprising exposing the plastic product to a depolymerase.

12. A process for degrading a spun plastic product comprising at least one polymer, said process comprising a melt-spinning step implemented with a plastic product in a partially or totally molten state and extruding a melt plastic product through spinnerets for non-woven products and wherein extruded fibers obtained in said melt-spinning step exhibit a porosity rate above 30% and contacting the extruded fibers with a biological depolymerizing agent able to degrade at least one polymer of said plastic product, and wherein said spun plastic product is obtained from rigid or flexible plastic wastes and/or from crystalline plastic fibers.

13. The process of claim 12, wherein the biological depolymerizing agent is a depolymerase.

14. The process of claim 12, wherein said polymer of said plastic product has been previously amorphized before the depolymerisation step.

15. A process for recycling a plastic product selected from rigid or flexible plastic wastes and/or from crystalline plastic fibers and comprising at least one target polymer, said process comprising comprising a melt-spinning step implemented with said plastic product in a partially or totally molten state and extruding a melt plastic product through spinnerets for non-woven products and wherein extruded fibers obtained in said melt-spinning step exhibit a porosity rate above 30% and contacting the extruded fibers with a biological depolymerizing agent, and wherein said at least one target polymer has been optionally amorphized.

16. The process of claim 15, wherein the process further comprises a step of recovering monomers and/or oligomers of said polymer.

17. The process of claim 15, wherein said biological depolymerizing agent is a depolymerase.

\* \* \* \* \*

SEQUENCE LISTING

<160> NUMBER OF SEQ ID NOS: 1

<210> SEQ ID NO 1
<211> LENGTH: 258
<212> TYPE: PRT
<213> ORGANISM: ARTIFICIAL SEQUENCE
<220> FEATURE:
<223> OTHER INFORMATION: CUTINASE

<400> SEQUENCE: 1

Ser Asn Pro Tyr Gln Arg Gly Pro Asn Pro Thr Arg Ser Ala Leu Thr
1               5                   10                  15

Ala Asp Gly Pro Phe Ser Val Ala Thr Tyr Thr Val Ser Arg Leu Ser
            20                  25                  30

Val Ser Gly Phe Gly Gly Gly Val Ile Tyr Tyr Pro Thr Gly Thr Ser
        35                  40                  45

Leu Thr Phe Gly Gly Ile Ala Met Ser Pro Gly Tyr Thr Ala Asp Ala
    50                  55                  60

Ser Ser Leu Ala Trp Leu Gly Arg Arg Leu Ala Ser His Gly Phe Val
65                  70                  75                  80

Val Leu Val Ile Asn Thr Asn Ser Arg Phe Asp Tyr Pro Asp Ser Arg
                85                  90                  95

Ala Ser Gln Leu Ser Ala Ala Leu Asn Tyr Leu Arg Thr Ser Ser Pro
            100                 105                 110

Ser Ala Val Arg Ala Arg Leu Asp Ala Asn Arg Leu Ala Val Ala Gly
        115                 120                 125

His Ser Met Gly Gly Gly Gly Thr Leu Arg Ile Ala Glu Gln Asn Pro
    130                 135                 140

Ser Leu Lys Ala Ala Val Pro Leu Thr Pro Trp His Thr Asp Lys Thr
145                 150                 155                 160

Phe Asn Thr Ser Val Pro Val Leu Ile Val Gly Ala Glu Ala Asp Thr
                165                 170                 175

Val Ala Pro Val Ser Gln His Ala Ile Pro Phe Tyr Gln Asn Leu Pro
            180                 185                 190

```
Ser Thr Thr Pro Lys Val Tyr Val Glu Leu Asp Asn Ala Ser His Phe
        195                 200             205

Ala Pro Asn Ser Asn Asn Ala Ala Ile Ser Val Tyr Thr Ile Ser Trp
    210                 215             220

Met Lys Leu Trp Val Asp Asn Asp Thr Arg Tyr Arg Gln Phe Leu Cys
225             230             235             240

Asn Val Asn Asp Pro Ala Leu Ser Asp Phe Arg Thr Asn Asn Arg His
            245             250             255

Cys Gln
```